March 30, 1965 G. E. COMSTOCK 3RD 3,175,747

TAPE READER APPARATUS

Filed March 26, 1962

INVENTOR
GEORGE E. COMSTOCK, 3d
BY
Douglas M. Clarkson
ATTORNEY

United States Patent Office 3,175,747
Patented Mar. 30, 1965

3,175,747

TAPE READER APPARATUS

George E. Comstock 3rd, Huntington, N.Y., assignor to Potter Instrument Company, Inc., Plainview, N.Y., a corporation of New York Filed Mar. 26, 1962, Ser. No. 182,577
2 Claims. (Cl. 226—39)

This invention, generally, relates to tape reader apparatus and, more particularly, to a tape reader apparatus adapted to start and stop the tape in an improved manner.

In a tape reader apparatus which is adapted to read perforated tape, it is the usual practice to drive the tape with a fast-acting pinch roller actuated by a solenoid and to stop the tape with a drag or solenoid actuated brake which is engaged when the pinch roller is released. By this means, it is possible to stop on the character which is used to encode the stop command even when the tape is moving at reading rates as high as 1000 characters per second or more.

However, one disadvantage of existing tape reader apparatus is that spring-back of the tape when the pinch roller is realeased occasionally causes the stop character to move backward over the reading head far enough so that it is read again when the next start command is received. The unit then stops again and fails to advance properly. In these tape reader apparatus, the pinch roller and drive capstan normally are located on the down-stream side of the reading head and the brake is normally located up-stream.

It is a principal object of this invention to provide an improved structure for tape reading apparatus.

It is also an important object of this invention to provide a tape reader apparatus in which the tape may be stopped on a character without tape jiggle either in a forward or backward direction during the stopping action.

A further object of the invention is to provide a new and improved tape reader apparatus to control the movement of the tape so accurately that a set of code characters on which the reader stops will not be reread when it starts up again because of any shift in tape location during stopping.

Briefly, a tape reader apparatus in accordance with the present invention includes a transducer means adapted to sense a predetermined information-representing code, such as a series of apertures, formed on a recording medium, such as an elongated web. Suitable means such as a drive capstan and pinch roller device is included to move the web relative to the transducer means, and a particularly positioned means having members on opposite sides of the transducer means and positioned contiguously relative thereto is adapted to react with the web in bringing the web to a stop. If desired, a brush means may be included and positioned on the downstream side of the transducer means to develop a relatively slight pulling force on the recording medium whereby a tendency in the recording medium to spring-back is reduced when the pinch roller is retracted.

These and other objects and advantages of the invention will become more apparent from the following detailed description of a preferred embodiment thereof taken in conjunction with the accompanying drawings, in which.

Figure 2:
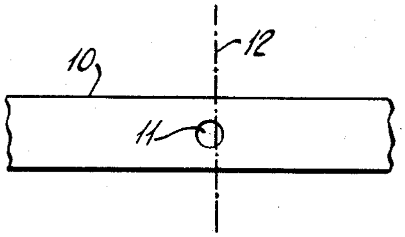
FIG. 2 shows a fragmentary portion of a perforated tape with a "stop" aparture shown in a position when the brake means is applied.
Figure 3:
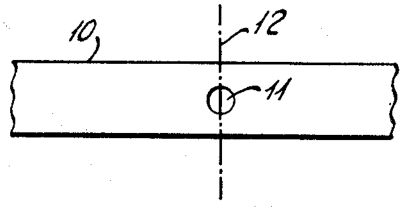
FIG. 3 is a view similar to FIG. 2 showing that in prior devices the tape continues to move after the brake means is applied.
Figure 4:
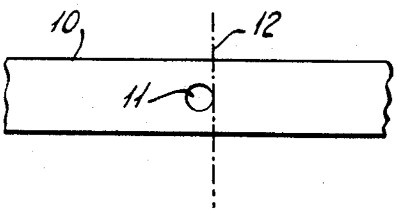
FIG. 4 is a view similar to FIG. 2 illustrating the final rest position of a tape after spring-back.

Referring now to the problem which the present invention solves and more particularly to FIGS. 2, 3 and 4 of the drawings, in prior tape reader apparatus, a tape 10 is provided with one or more apertures, illustrated by a single aperture 11 in FIG. 2, to develop a "stop" signal. In these prior apparatus, when the "stop" signal is developed, the pinch roller and drive capstan device on the down-stream side is released and the brake on the up-stream side is applied. The line 12 illustrates the position of the aperture 11 relative to the reading head when the brake is applied.

In prior apparatus, the tape continues to move after the brake is applied, as for example by elongating or stretching of the tape, and this is illustrated in FIG. 2, showing the tape 10 with the aperture 11 relative to the line 12.

Then, the tape 10 developes a spring-back so that it comes to rest in a position illustrated by FIG. 4 wherein it is shown that the aperture 11 stops at a position relative to the line 12 showing that the aperture 11 will be reread when the tape is advanced again.

*The invention*

Figure 1:
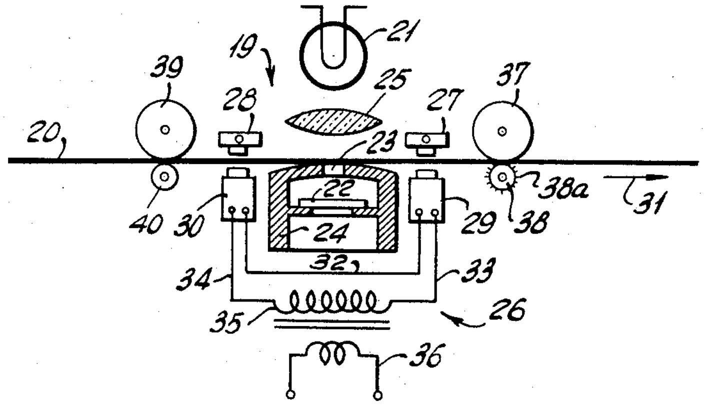
FIG. 1 is a diagrammatical illustration partly in cross section showing the principles of the invention.

Referring now to FIG. 1 of the drawings, while a tape 20 may be processed in any desired manner to store information thereon, such as by applying light reflective spots or other marks, for the purposes of this description it will be assumed that the tape 20 is processed for information storage by forming therein a plurality of apertures in a predetermined pattern.

A transducer 19 is provided to sense these apertures. In the transducer 19, a light or other radiation source 21, is detected by a suitable element such as a photo-electric cell 22 when the apertures pass an opening 23 in a housing 24. A lens 25 is positioned appropriately relative to the light source 21 to focus the radiation through the opening 23 onto the photo-electric cell 22 when an aperture in the tape 20 passes.

The light source 21 is shown diagrammatically since, in practice, it may be desirable to enclose the light source 21 leaving a small opening in the direction of the lens 25. In addition, a suitable reflector (not shown) may be placed behind the light source 21 to direct more of the radiation toward the lens 25, if desired.

Also, the housing 24 is shown diagrammatically since this housing may assume any desired configuration, it being required only that a radiation detector 22 be supported therein and the opening 23 be located appropriately to permit radiation to pass therethrough for focusing on the radiation detector 22.

A brake means in accordance with the invention is identified generally by the numeral 26 and includes a brake member 27 positioned as closely as practicable adjacent one side of the housing 24, and a second brake member 28 is positioned as close as practicable adjacent the opposite side of the housing 24. The two brake members 27 and 28 may be of the "drag" type; that is, they may be passive, taking the form of constant-contact, spring-loaded brake shoes.

However, as shown in the drawings, the brake members 27 and 28 are both active in the sense of employing solenoid actuators 29 and 30, respectively, for modulating the drag force developed by the members 27 and 28. Alternatively, assuming that the tape 20 is moving in the direction of the arrow 31, the brake member 27 on the down-stream side may be of the passive type, and the brake member 28 on the up-stream side may be of the active type.

When both brake members 27 and 28 are of the active type, it is preferred that they be operated substantially simultaneously, and this is illustrated by the common connection 32 and the connections 33 and 34 between the secondary winding 35 of an electrical actuator source 36.

For the tape 20 to move in the direction of the arrow 31, a pinch roller 37 is placed against the tape 20 to position it in contact with a drive capstan 38 with sufficient force to cause movement in the tape 20 relative to the transducer 19.

If it is desired to reverse the direction of movement for the tape 20, a pinch roller 39 is positioned on the up-stream side of the transducer 19, as viewed in FIG. 1, to react with a capstan 40.

As an alternative to the closely spaced brake members 27 and 28, a plurality of fibers **38*a* are arranged in the form of a disc about the center of the capstan 38 and coaxially therewith to develop a light pull on the tape 20 when the pinch roller 37 is de-energized. The fibers 38*a* project beyond the surface of the capstan 38 a distance equal to two or three times the normal separation between the capstan 38 and the pinch roller 37 when the pinch roller is de-energized. The fibers 38*a*** may be any suitable resilient, wear resistant material such as nylon, Teflon, etc.

Of course, if desired, a separate disc may be used in place of putting the resilient, wear-resistant fibers on the capstan 38. However, it is contemplated that this arrangement, while being satisfactory, may be ruled out economically.

It will be understood that other modifications may occur to one skilled in the art to which the invention pertains in view of the preceding description, and it is understood that the scope of the invention is defined by the scope of the claims appended hereto.

What is claimed is:

1. In a tape reader apparatus, the combination comprising,
   - a transducer means adapted to sense a predetermined information-representing code formed on a recording medium;
   - driving means to develop relative movement between the recording medium and the transducer means;
   - first and second separate brake means separate from said driving means disposed on opposite sides of the transducer means and contiguous thereto and adapted to react with the recording medium substantially simultaneously; and
   - a common electrical means to actuate the brake means whereby a tendency in the recording medium to spring back is reduced when the driving means is removed.

2. In a tape reader apparatus, the combination comprising,
   - a transducer means adapted to sense a predetermined information-representing code which is processed in a predetermined manner on an elongated movable web,
   - drive means to develop relative movement between the recording medium and the transducer means;
   - first and second separate brake means separate from said drive means disposed on opposite sides of said transducer means and positioned contiguously relative thereto to react with said web along the longitudinal axis of movement of said web; and
   - actuator means adapted to operate said members at substantially the same time whereby a tendency in the recording medium to spring back is reduced when the drive means is removed.

References Cited by the Examiner

UNITED STATES PATENTS

| | | | |
|---|---|---|---|
| 2,601,713 | 7/52 | Nield | 222—193 X |
| 2,864,609 | 12/58 | Trimble | 226—39 X |
| 2,909,337 | 10/59 | Lahti et al. | 242—55.12 |
| 2,999,625 | 9/61 | La Pointe | 226—51 |
| 3,062,464 | 11/62 | Moose et al. | 242—55.12 |
| 3,065,891 | 11/62 | Wardell | 226—95 |
| 3,074,661 | 1/63 | Brumbaugh et al. | 242—55.12 |
| 3,091,408 | 5/63 | Schoeneman | 226—97 X |
| 3,100,591 | 5/63 | Trimble | 226—39 |
| 3,103,656 | 9/63 | Laman et al. | 226—45 X |
| 3,115,314 | 12/63 | Manley et al. | |

ROBERT B. REEVES, *Acting Primary Examiner.*

JOSEPH P. STRIZAK, RAPHAEL M. LUPO, ERNEST A. FALLER, *Examiners.*